Patented Jan. 4, 1927.

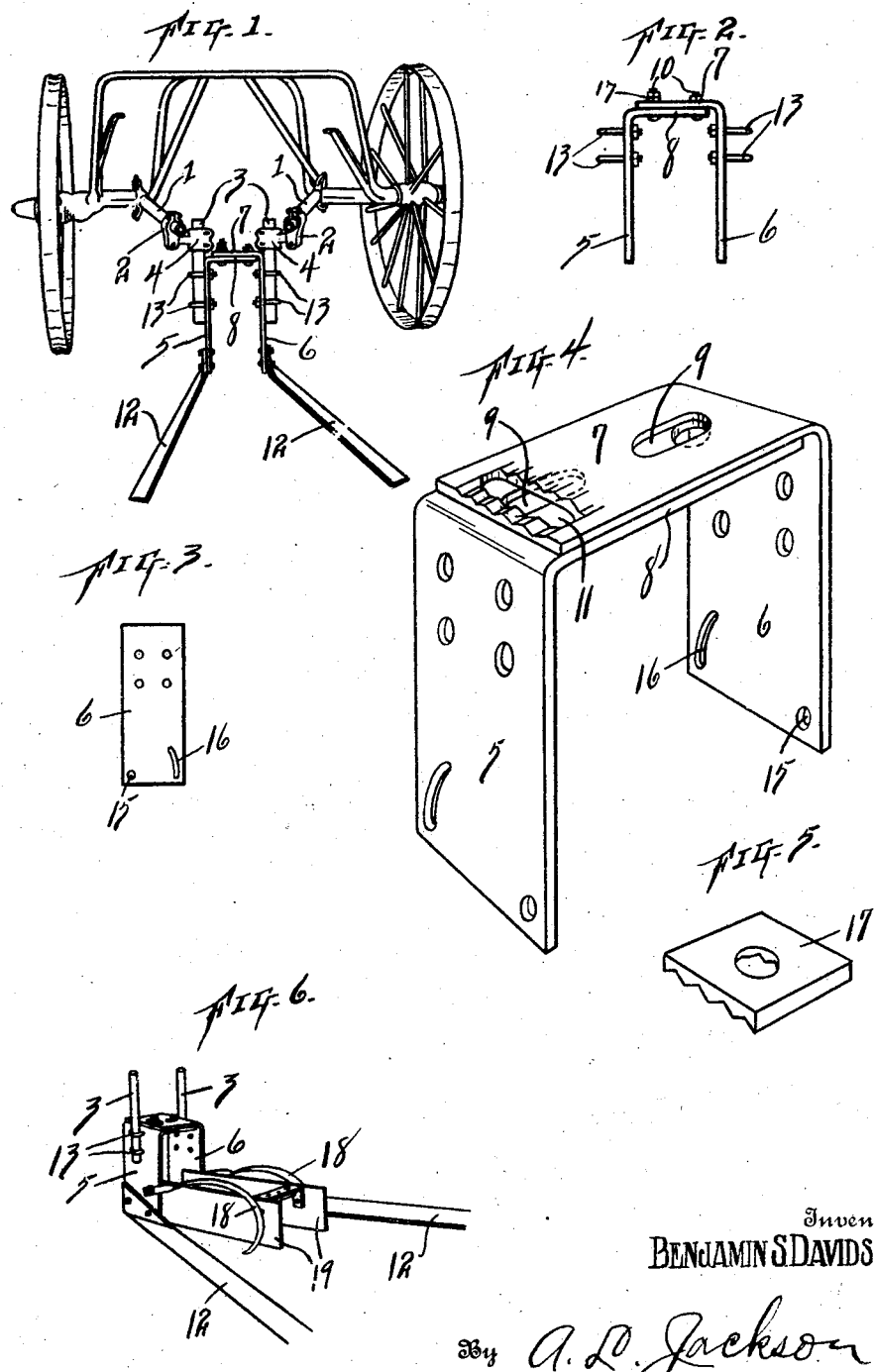

1,612,855

UNITED STATES PATENT OFFICE.

BENJAMIN S. DAVIDSON, OF DENTON, TEXAS.

PLOW-ATTACHING DEVICE FOR CULTIVATORS.

Application filed November 21, 1925. Serial No. 70,446.

My invention relates to cultivator attachments and more particularly to devices for attaching weeding blades to cultivators; and the object is to provide certain attaching devices for mounting weed cutting blades and soil stirring blades or plows on the standards of cultivators and to provide devices which are adjustable and which will hold the blades fixedly in different positions so that the blades or plows may be set at different angles or heights or widths and which will be durable and which will not be displaced in operation. Other objects and advantages will be fully explained in the following description and the invention will be more particularly pointed out in the claims.

Reference is had to the accompanying drawings which form a part of this application.

Fig. 1 is a rear elevation of a sufficient portion of a cultivator to illustrate the invention which is applied thereto.

Fig. 2 is a rear elevation of the attachments.

Fig. 3 is a side elevation of one leg of the attaching devices.

Fig. 4 is a perspective view, showing the construction of the two principal parts of the attachments.

Fig. 5 is a perspective view of a washer corrugated to make adjustments with one member of the attaching devices.

Fig. 6 is a perspective view, showing scarifiers and fenders applied to the attaching devices.

Similar characters of reference are used to indicate the same parts throughout the several views.

The device herein shown is for the purpose of attaching weed cutting or soil cutting blades to the beams of cultivators. The beams 1 are of the ordinary type and cuffs 2 are used in the usual way for the standards 3 which are mounted on the cuffs 2 by clips 4 and are clamped on the standards with their shanks projecting through the lower parts of the cuffs 2. The blades attaching devices include two relatively wide L-shaped holders 5 and 6 which are vertically disposed and have horizontal connecting members 7 and 8 which are adjustable relative to each other.

The holders 5 and 6 are attached to the standards 3 by U-bolts 13 and the blades 12 are attached to the lower ends of the holders 5 and 6 by suitable nuts and bolts. The holders 5 and 6 have holes 15 for the bolts and curved slots 16 for bolts so that the blades 12 may be set at different angles. It is apparent that the holders 5 and 6 can be attached at different heights on the standards 3 by means of the U-bolts 13.

For lateral adjustment of the parts 7 and 8, slots 9 are made vertically through the members or shanks 7 and 8, the slot 9 in member 7 being near the bend or juncture with the member 6. The slot 9 in the member 8 is near the bend thereof. The bolt 10 running through the cylindrical opening in the member or shank 8 will serve as a pivot for swinging the shanks 7 and 8 on each other to permit adjustments of the blades 12 to different angles to each other. The shank 7 has a transverse slot 11 to permit the swinging of the shanks 7 and 8 on each other. The upper surface of the shank 7 about the slot 11 is corrugated and the lower surface of the washer 17 is corrugated to engage the corrugations of part 7. The bolt 10 for the corrugated end of shank 7 projects upwardly through the slot 9, the transverse slot 11, the corrugated washer 17 and has a nut on its upper end. The washer 17 can be set at different adjustments on the corrugated surface of member 7 for holding the members 7 and 8 at different adjustments relative to each other.

Scarifiers 18 and fenders 19 are attached to the members 5 and 6 for cultivating purposes. See Fig. 6 of the drawings. The fenders 19 are attached to the inner sides of the members 5 and 6 and the scarifiers are attached to the outer sides of the same.

What I claim, is,—

1. In a cultivator provided with plow beams and standards carried thereby; blade attaching devices comprising upright members having horizontal shank connections at their upper ends lapping on each other, the upper shank member having a longitudinal slot and a transverse slot and having its upper surface corrugated near the end thereof and the lower shank member having a longitudinal slot associated with the transverse slot of the upper member and having a cylindrical opening associated with the longitudinal slot of the upper member, a washer having its under surface corrugated to cooperate with the corrugated surface of said upper shank member, a bolt running through said washer and the adjacent slots, a bolt running through said cylindrical opening and through the longitudinal slot adjacent thereto, nuts for said bolts for clamping said shank members rigidly together, and means for attaching said upright members to said standards.

2. In a cultivator provided with plow beams and standards carried thereby; blade attaching devices comprising upright members having horizontal shank connections at their upper ends lapping on each other and one shank having a cylindrical opening and both shanks having slots longitudinally therethrough for lateral adjustments, one shank having a transverse slot and corrugations about said slot, a washer having corrugations for engaging the corrugations of said shank, a bolt operating through said transverse slot and washer, and the adjacent longitudinal slot, and another bolt operating through said cylindrical opening and the adjacent longitudinal slot, nuts for said bolts, and U-bolts for attaching said upright members to said standards.

3. In a cultivator provided with plow beams and standards carried thereby; blade attaching devices attached to said standards and having horizontal shank connections at their upper ends lapping on each other, one shank having a longitudinal slot and a transverse slot and the other shank having a cylindrical opening co-operating with said longitudinal slot and having a longitudinal slot co-operating with said transverse slot, corrugations on the upper surface of said shank about said transverse opening, a washer having corrugations for engaging the corrugations of said shank member, and nuts for clamping said washer and said shanks together.

4. In a cultivator provided with plow beams and standards carried thereby; blade attaching devices attached to said standards and having horizontal shank connections at their upper ends partly corrugated and lapping on each other, one shank having a longitudinal slot and a transverse slot and the other shank having a cylindrical opening co-operating with said longitudinal slot and having a longitudinal slot co-operating with said transverse slot, bolts for clamping said shanks on each other, blades attached to said blade attaching devices, and fenders attached to the inside of said blade attaching devices and scarifiers attached to the outsides of said blade attaching devices for co-operating with said blades.

In testimony whereof, I set my hand, this 18th day of November, 1925.

BENJAMIN S. DAVIDSON.